United States Patent [19]
Erlenmaier et al.

[11] Patent Number: 4,583,792
[45] Date of Patent: Apr. 22, 1986

[54] ASSEMBLING AID ON CRAWLER TRACK CHAINS

[75] Inventors: Günter Erlenmaier, Vellmar; Klaus Spies, Remscheid, both of Fed. Rep. of Germany

[73] Assignee: Diehl GmbH & Co., Nuremberg, Fed. Rep. of Germany

[21] Appl. No.: 596,285

[22] Filed: Apr. 3, 1984

[30] Foreign Application Priority Data

Apr. 22, 1983 [DE] Fed. Rep. of Germany ....... 3314685
Feb. 17, 1984 [DE] Fed. Rep. of Germany ....... 3405699

[51] Int. Cl.[4] .............................................. B62D 55/20
[52] U.S. Cl. ................................ 305/42; 305/58 PC
[58] Field of Search .......... 474/166; 305/58 R, 58 PC, 305/59, 42, 43

[56] References Cited

U.S. PATENT DOCUMENTS

| | | | |
|---|---|---|---|
| 2,409,502 | 10/1946 | Leguillon et al. | 305/42 X |
| 2,430,573 | 11/1947 | Krotz | 305/42 |
| 2,957,731 | 10/1960 | Backhaus | 305/58 PC |
| 3,362,759 | 1/1968 | Ley | 305/59 |

FOREIGN PATENT DOCUMENTS

| | | | |
|---|---|---|---|
| 1983855 | 1/1966 | Fed. Rep. of Germany | 305/58 PC |
| 1281288 | 4/1969 | Fed. Rep. of Germany | 305/58 R |
| 1480775 | 7/1969 | Fed. Rep. of Germany | 305/58 PC |
| 2919930 | 11/1980 | Fed. Rep. of Germany | 305/58 PC |
| 208301 | 3/1968 | U.S.S.R. | 305/59 |

Primary Examiner—David A. Scherbel
Attorney, Agent, or Firm—Scully, Scott, Murphy & Presser

[57] ABSTRACT

An arrangement forming an assembling aid on crawler chains for track-laying or crawler track vehicles, whose chain link members are equipped with rubber-cushioned coupled pins, and which are interconnected through the intermediary of clamp-like connectors slideable over the ends of the coupling pins and adapted to be fixedly anchored by means of a screw. The coupling pins which are to be interconnected in the assembled condition are provided with securing elements which engage into a slot formed in the connector. Each individual coupling pin is equipped with separate adjusting or setting elements, which protrude cog-like beyond the cross-section of the coupling pin, wherein the adjusting elements evidence a lower height or diameter relative to the width of the slot in the clamped-in condition of the connector, and wherein guide surfaces are formed on the connector for the preadjustment and final adjustment of the adjusting elements.

5 Claims, 10 Drawing Figures

ASSEMBLING AID ON CRAWLER TRACK CHAINS

BACKGROUND OF THE INVENTION

1. Field of the Invention

The present invention relates to an arrangement forming an assembling aid on crawler chains for tracklaying or crawler track vehicles, whose chain link members are equipped with rubber-cushioned coupling pins, and which are interconnected through the intermediary of clamp-like connectors slideable over the ends of the coupling pins and adapted to be fixedly anchored by means of a screw, wherein the coupling pins which are to be interconnected in the assembled condition are provided with securing elements which engage into a slot formed in the connector.

2. Discussion of the Prior Art

From the disclosure of German Petty Pat. No. 19 83 855, there has become known a securing arrangement for crawler track chain connectors, by means of which coupling pins having circular cross-sections, as well as polygonal cross-sections, can be fastened in position through the use of connectors and clamping screws. The coupling pins are provided in proximity to their ends with a through-bore which is in alignment with the slot formed in the connector, into which a pin has been inserted prior to the sliding on of the connector. By means of this pin, the coupling pins or bolts are maintained in their correct angled position relative to each other, so that the connector allows itself to be easily applied.

The adjustment between two coupling pins must be carried out prior to the sliding on of the connector onto the coupling pins. This signifies that the pins must be coaxially oriented with respect to their bores, and that these bores must be fixed in position during the introduction of the securing pin. This necessitates the utilization of a special positional anchoring arrangement. Moreover, it is also disadvantageous that the pins which, usually are rubber-cushioned in the chain links, must resiliently yield during the introduction of the securing pin into the chain links, and as a result must additionally be specially anchored in order to allow for a rapid assembly of the securing pin.

This type of assembling is subjected to considerable problems under operational field conditions since, as is known, such arrangements are subjected to rough handling and terrain.

SUMMARY OF THE INVENTION

Accordingly, it is an object of the present invention to provide an adjusting device which can be manipulated in a simple and timesaving manner in the assembling of chain link segments during manufacture thereof, as well as during the assembling of a complete track chain or during the exchange of chain links on a vehicle under field conditions.

The foregoing object is inventively achieved in an arrangement as described hereinabove, in that each individual coupling pin is equipped with separate adjusting or setting elements, which protrude cog-like beyond the cross-section of the coupling pin, wherein the adjusting elements evidence a lower height or diameter relative to the width of the slot in the clamped-in condition of the connector, and wherein guide surfaces are formed on the connector for the preadjustment and final adjustment of the adjusting elements.

It is important for the present invention, that through the use of a measure on the coupling pin which is simple constructively and in the manufacture thereof, no additional arrangements are necessary, inasmuch as during the assembling of the connector, the latter will positionally anchor the coupling pin at the required assembling angle.

The adjusting elements which are located on every coupling pin can be inexpensively produced. For coupling pins which possess a circular cross-section, a cross-section which is almost circular, or a polygonal cross-section, the above-mentioned coupling pins which incorporate the subject matter of the invention can be provided with the connector so as to be secure and precisely positioned with regard to the assembling angle and contour. The coupling pins cannot be any longer offset relative to their contour and thereby seated in the connector so as to be exposed to the danger of fracturing. In the terrain, or on the vehicle, the assembling of the connector causes no problems, inasmuch as the adjusting elements of the coupling pins will act self-adjustingly during the hammering on or applying of the connector. With respect to the assembling angle there can be stated that the rubber-cushioned coupling pins are pressed into the chain links members, wherein the pin ends interconnect the individual chain links into a complete chain by means of the connectors. Since the tracked vehicle chain will traverse at the drive mechanism a predetermined looping about driving wheels, deflecting wheels and driving rims, but must also correlate to irregularities of the terrain ground surfaces over which it travels, the rubber support traverses through extensive positive and negative torsional tracks. In order to obtain a high life expectancy for the torsionally-elastic rubber support, the coupling pins are pressed into the chain link members under an assembling angle which is determined pursuant to predetermined criteria. This measure must be considered during the production of the chain link segments in the manufacturing plant, as well as during the attachment of a chain track or length, or such as during the exchange of chain link members on a vehicle.

DETAILED DESCRIPTION

Figure 1:
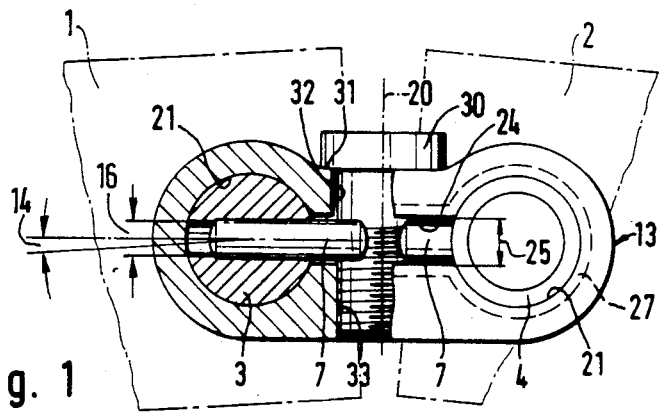
FIG. 1 illustrates, partly in section, an end view of a connector with coupling pins for a dually-hinged track chain link.
Figure 3:
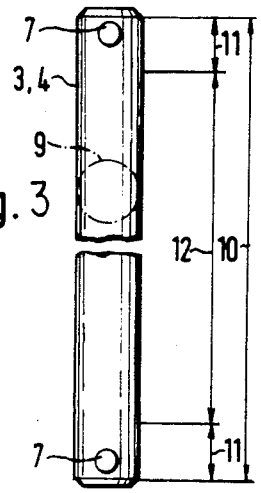
FIG. 3 illustrates a detail of a coupling pin employed in the connector of FIG. 1.
Figure 2:
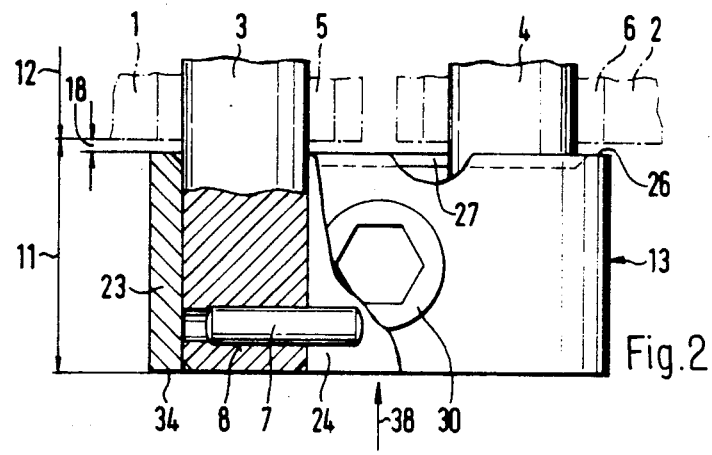
FIG. 2 is a plan view of the connector of FIG. 1, shown partly in section.

Referring in detail to FIGS. 1 to 3 of the drawings, arranged in chain link members 1 and 2 (shown in phantom lines) of a dually-hinged coupling pin chain 15, are coupling pins 3 and 4 with known rubber bushings or supports 5 and 6. The coupling pins 3 and 4, which possess circular cross-sections 9, are provided at their ends, as also shown in FIG. 2, with lateral or transverse pins 7. These pins 7 are inserted load-transmissively into correspondingly stepped bores 8 formed in the coupling pins 3 and 4. The coupling pins 3 and 4 possess stepless or uniform circular cross-sections 9 along their entire length 10; in effect, also in the regions 11 of the connectors 13 and in the region 12 of the rubber bearings 5 and 6.

The connector 13 is constructed symmetrically with respect to the axis 20. The connector evidences a certain type of support 21, including a clamping capability 25 provided by a slot 24, and a surface 31 for a screw 30, a bore 32 and a threaded bore 33. The transverse pins 7 extend into the slot 24 at a small sideways play. These transverse pins 7 are located between the screw 30 and the outer surface 34 of the connector 13.

In the surface 26 facing towards the chain link members, the bearing bosses 21 and the slot 24 are encompassed by a conically-extending guide surface or extension 27.

During the assembly of the connector 13, the coupling pins 3 and 4 of the chain link members 1 and 2, which are equipped with the transverse pins 7, are oriented to be self-adjusting relative to the bearing bases 21 and the slot 24. The rubber support bearings 5 and 6, in the illustrated positions, anchor the coupling pins 3 and 4 with the pins 7 in the chain link members 1 and 2 in conformance with the assembling angle 14. The connector 13 is then slid onto the coupling pins 3 and 4 in the direction of arrow 38. The subsequently inserted screw 30 then anchors the coupling pins 3 and 4 in the connector so as to be load-transmissive and secure against friction. The load-transmissive connection so designed that no relative movement will occur between the coupling pins 3 and 4 and the connector 13. The transverse pins 7 only have the task of ensuring the correct assembled position of the coupling pins 3 and 4 in the connector 13 in conformance with the angle 14. For the absorption of any transverse forces; in essence, as security against rotation of the coupling pins, it is noted that the transverse pins 7 are not provided for this purpose.

Figure 4:
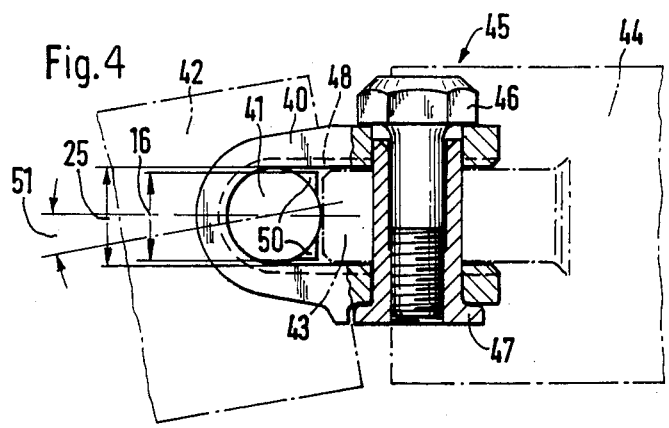
FIG. 4 illustrates, partly in section, and end view of a connector for a single-hinged track chain link.

According to the embodiment of FIG. 4, a clamp 40 connects a rubber-cushioned circularly cross-sectional coupling pin 41 for a chain link member 42 with a protuberance 43 on a chain link member 44 of a single-hinged coupling pin chain 45. The clamp 40 is arranged by means of a screw 46 and a clamping sleeve 47 on the protuberance 43 and on the coupling pin 41 which includes cog 50 welded thereto. The assembling angle 51 is twice as large as the angle 14 in FIG. 1.

Figures 5, 6:
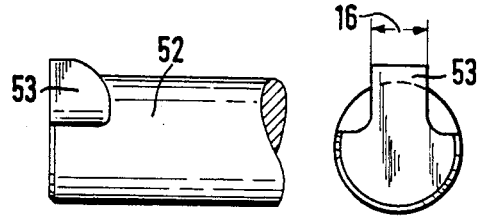
FIGS. 5 and 6 illustrates, respectively, side and end views of one embodiment of a coupling pin.

Pursuant to the embodiment of FIGS. 5 and 6; a coupling pin 52 is provided with a protuberance 53 formed thereon through cold or hot deformation.

Figure 7:
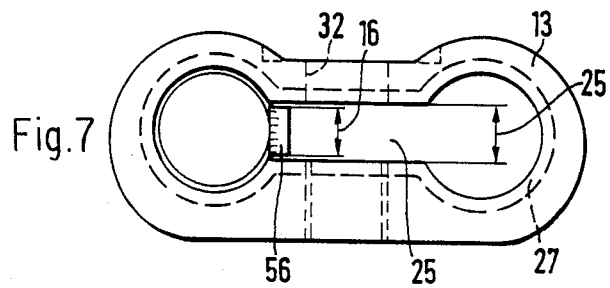
FIGS. 7 and 8 illustrate, respectively, end and plan views, partly in section, of another embodiment of a coupling pin in a connector.
Figure 8:
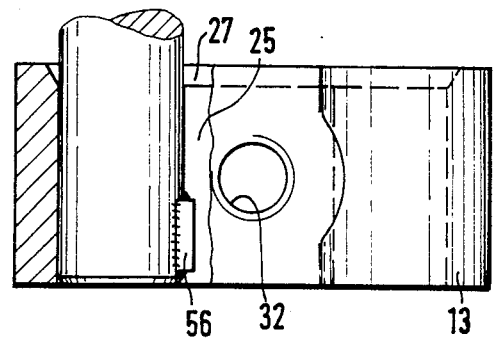

Pursuant to the embodiment of FIGS. 7 and 8, a protuberance 56 is welded onto a coupling pin 55. The protuberance 56 extends into the slot 25 formed in the connector 13.

Figure 9:
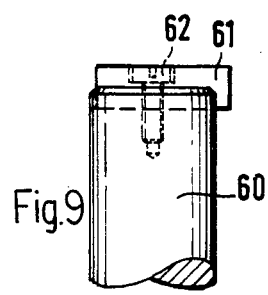
FIGS. 9 and 10 illustrate, respectively, side and end views of yet another embodiment of a coupling pin.
Figure 10:
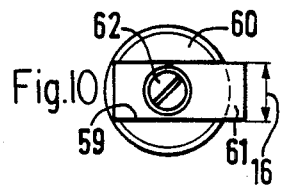

According to the embodiment of FIGS. 9 and 10 a fitted spring 61 is inserted into a groove 59 formed in the coupling pin 60, and fastened thereto by means of a screw 62.

All of the described exemplary embodiments have in common that the adjusting or setting elements 7, 50, 53, 56, 61 evidence a lower height 16 or a smaller diameter than the width 25 of the slot 24 in the connector. In the same manner, arranged on the connector 13, with reference to every type of construction of the adjusting elements 7, 50, 53, 56, 61, are the conical surface 27 on the inlet side 26 of the connector 13 and the somewhat planar-parallel guide surfaces 19.

What is claimed is:

1. In an arrangement forming an assembling aid on crawler chains for crawler track vehicles, including rubber-cushioned coupling pins for the chain link members; clamp-like connectors having slots therein, said connectors being slideable over the ends of the coupling pins, and screws anchoring said connectors onto said coupling pins for interconnection of said chain link members; and securing elements engaging into said slots in the connectors in the assembled position of the coupled pins which are to be interconnected; the improvement comprising: said coupling pins being substantially circular in cross-section; said securing elements including adjusting elements being provided on each said coupling pin, said adjusting elements extending protuberance-like beyond the cross-section of said coupling pin into said slot, the adjusting elements having a lower height or diameter relative to the width of said slot in the clamped position of said connector; and guide surfaces being located on the connector for effectuating the preadjustment and final adjustment of the adjusting elements.

2. Arrangement as claimed in claim 1, wherein said adjusting elements comprise pins and are press-fitted into bores formed in said coupling pins.

3. Arrangement as claimed in claim 1, wherein said adjusting elements comprise protuberances welded to said coupling pins.

4. Arrangement as claimed in claim 1, wherein said adjusting elements comprise fitted spring means supported in grooves formed in the end surfaces of said coupling pins; and means for fixedly screwing said spring means into said grooves.

5. Arrangement as claimed in claim 1, wherein said adjusting elements comprise protuberances integrally formed on said coupling pins.

* * * * *